United States Patent [19]

Katzen

[11] 4,082,859

[45] Apr. 4, 1978

[54] CONVERSION OF CELLULOSE AND LIGNIN ORGANIC WASTE MATERIAL INTO A MORE DIGESTIBLE AND MANAGEABLE FORM

[76] Inventor: Sol Katzen, Hanasi St. No. 62, Herzilya Pituach, Israel

[21] Appl. No.: 592,227

[22] Filed: Jul. 1, 1975

[51] Int. Cl.$^2$ ............................................. A23K 1/12
[52] U.S. Cl. .................................. 426/636; 426/626; 426/807
[58] Field of Search .................................. 127/36–38; 426/635, 636, 2, 69, 74, 807, 623, 626; 71/25; 210/45, 59

[56] References Cited

U.S. PATENT DOCUMENTS

| | | | |
|---|---|---|---|
| 1,190,953 | 7/1916 | Renshaw | 426/636 |
| 1,472,320 | 10/1923 | Beckmann | 426/636 |
| 3,050,383 | 8/1962 | Wilson | 71/21 |
| 3,251,716 | 5/1966 | Porter | 426/635 |
| 3,692,530 | 9/1972 | Graham | 426/636 |

OTHER PUBLICATIONS

Grant "Hackh's Chemical Dictionary," McGraw-Hill Book Co., Fourth Edition, 1969, pp. 314, 315, 452 and 453.

*Primary Examiner*—R. B. Penland

*Attorney, Agent, or Firm*—Virgil H. Marsh

[57] ABSTRACT

A process for the conversion of cellulose and lignin organic waste materials into a more digestible and manageable form. The process includes reducing, if necessary, the cellulose or lignin organic waste material to a size to 2 inches or less. An acid selected from the group consisting of phosphoric acid, hydrochloric acid, sulfuric acid and mixtures thereof is admixed with about 40 to about 60 percent by weight of the organic waste material. Before, after or simultaneously with such admixing steps, a base selected from the group consisting of calcium hydroxide, sodium hydroxide, potassium hydroxide, ammonium hydroxide and mixtures thereof is admixed with the remainder of the organic waste material. The acidified waste material is mixed and reacted with the basified organic waste material, a more digestible form of said organic waste material resulting. About 80 to 120 parts by weight of the acidified organic waste material is used per 100 parts by weight of the basified organic waste material. Water is converted to steam by heat of such reaction provided the reaction mixture contains about 20 to 60 percent by weight, based on the total weight of the reaction mixture, of water. The reacted mixture is formed into pellets, cubes, blocks or other similar forms.

12 Claims, No Drawings

CONVERSION OF CELLULOSE AND LIGNIN ORGANIC WASTE MATERIAL INTO A MORE DIGESTIBLE AND MANAGEABLE FORM

BACKGROUND OF THIS INVENTION

1. Field of this Invention

This invention relates to a process for converting cellulose and lignin organic waste material into a more digestible and manageable form.

2. Prior Art

The addition of chemicals to cellulose or lignin bearing materials to alter their chemical structure is well known. The limitations of such processes have been (a) excessive cost, (b) the necessity of removing or neutralizing such chemicals, (c) the lack of digestibility due to the presence of such chemicals and (d) the complicated and sometimes dangerous pressure equipment used in such treatments.

The serious problems associated with the disposal of certain organic wastes has lately been complicated by attempts to control or eliminate any environmental pollution caused by the accumulation or disposal of those organic wastes. The use of sulphuric acid and hydrochloric acid by themselves as hydrolysis agents is well known, but their use has serious disadvantages as those acids add little nutritional value and must be removed or neutralized before the organic waste material can serve as, or in, an animal feed.

Attention is drawn to U.S. Pat. Nos. 3,294,826, 3,212,932, 3,331,676, 2,744,824, 1,718,297, 3,050,383, 517,661, 517,662, 1,105,607 and 1,420,596.

BROAD DESCRIPTION OF THIS INVENTION

An object of this invention is to provide a relatively inexpensive process for converting cellulose and lignin organic waste material into a more digestible and manageable form. Another object is to provide a process that eliminates the above-noted prior art problems. Other objects and advantages of this invention are set forth herein or are obvious herefrom to one ordinarily skilled in the art.

The objects and advantages of this invention are achieved by the process of this invention.

This invention involves a process for the conversion of cellulose and lignin organic waste materials into a more digestible and manageable form. The process includes reducing, if necessary, the cellulose or lignin organic waste material to a size to 2 inches or less. An acid selected from the group consisting of phosphorix acid, hydrochloric acid, sulfuric acid and mixtures thereof is admixed with about 40 to about 60 percent by weight of the organic waste material. Before, after or simultaneously with such admixing step, a base selected from the group consisting of calcium hydroxide, sodium hydroxide, potassium hydroxide, ammonium hydroxide and mixtures thereof is admixed with the remainder of the organic waste material. The acidified organic waste material is mixed and reacted with the basified organic waste material, a more digestible form of said organic waste material resulting. About 80 to 120 parts by weight of the acidified organic waste material is used per 100 parts by weight of the basified organic waste material. Water is converted to steam by the heat of such reaction provided the reaction mixture contains about 20 to 60 percent by weight, based on the total weight of the reaction mixture, of water. The reacted mixture is formed into pellets, cubes, blocks or other similar forms.

The organic waste material can be, for example, straw, stover, cotton gin waste, animal manure, vegetable waste, wood shavings, bagasse, corn cobs, garbage, etc. The size reduction is preferably achieved by chopping or grinding. The organic waste material of step (a) is preferably divided into two nearly equal portions and each portion thereof is conveyed to the admixing sites of steps (b) and (c). The conveying can be achieved by a belt, screw or pneumatic conveyor. Admixing steps (b) and (c) are each preferably achieved in a continuous mixer. Preferably step (b) is achieved a first continuous mixer and step (c) is achieved in a second continuous mixer. Steps (b) and (c) can be achieved sequentially in a single continuous mixer. Admixing steps (b) and (c) are achieved at a temperature between about 20° and about 150° F. Preferably all of the acids are used in step (b) and all of the bases are used in step (c). The acidified organic waste material and the basified organic waste material can be (for example) immediately, upon mixing in the acid and base, respectively, be mixed in step (d). Preferably mixing step (d) is achieved in a continuous mixer. Step (d) is achieved at a temperature between 20° and 150° F. The water level in step (d) can be achieved by the previously drying the mixture of step (d); or the water level in step (d) can be achieved by adding the appropriate amount of water to the mixture of step (d). Step (e) preferably utilizes pelletizing.

The process of this invention eliminates the prior art problems and also results in a higher degree of digestibility than has been heretofore possible with the use of conventionally available feed manufacturing equipment. The organic waste material, for example, is straw, such as, wheat, barley, oats and rice, stover, such as, corn and milo, cotton waste, grape pomice, animal manures, such as, cattle litter, vegetable wastes, wood shavings, sawdust garbage, such as, bagasses, chicken and other poultry litter, sugar cane bagasse, peanut hulls, peat, tobacco stems, cocoa shells, rice hulls, soybean hulls and any other waste organic material.

As shown by laboratory and field trials, this invention achieves a dry matter digestibility of between 60 and 80 percent (for ruminants, at least) for the straw and cotton waste as compared to less than 40 percent for the untreated material. The digestibility of other organic waste materials raised proportionately.

This invention also involves the use of the product of the process of this invention as an animal feed or in an animal feed, plus such product by itself (as an animal feed) or in an animal feed.

DETAILED DESCRIPTION OF THIS INVENTION

The organic waste material is reduced in size by any convenient method to a size of not over 2 inches. For example, the size reduction can be achieved by grinding or chopping. The size reduction facilitates further handling and subsequent chemical treatments.

The acids and bases can each be added all at once or in batches or continuously.

The degree to which the cellulose and lignin are hydrolyzed to make them more digestible depends to a great extent on the amounts of acids and bases used in the mixer in the separate mixing steps. Since this invention can use twice as much total acid and twice as much total base as would be acceptable if the separate mixes were not combined in approximately equal proportions in the reactor step, this invention increases digestibility considerably beyond that which would be practical by using acid or base alone. Further, by using a combination of acids and bases, this invention achieves a greater hydrolytic effect (hydrolysis) without the limitations of excess mineral addition.

Even though relatively high levels of hydrolyzing acids or bases are used in each half of the process, the final percentages of the minor constituents permit the use of more than 20 percent of the treated material of this invention in a mixed final feed without exceeding accepted limits.

The acids act both as acidulating agents and hydrolyzing agents. The amount of each acid and the total of the acids depends upon their strength, the strength and amount of the bases and the amount of organic waste.

The acids hydrolyze the cellulose and/or lignin containing organic waste material, e.g., cotton gin trash, which usually contains fibers, into a more digestable material. The degree of hydrolysis generally depends on the amount of acids used and the temperature, pressure and time allowed for the reaction.

The admixing steps and the reaction step can generally be conducted at a temperature between about 20° to about 150° F., although room temperature is preferred. The admixing steps and the reaction step can last from a few seconds to many minutes, as the important factor is that the admixing or reaction be thorough. The preferred organic waste is straw.

It is not necessary to recover the acids from the process due to the fact the acids added to the waste material contain valuable feed ingredients.

The process of this invention is economical, the processing equipment is not elaborate and the ingredients are cheap. The organic waste material is converted into a more digestible form which can be used as, or in, an animal feed.

The cost of the acids and bases are approximately equal to the cost of mineral salts that would normally be added to a normal diet to meet the nutrient requirements. Hence, the hydrolyzing effect of this invention is almost entirely defrayed. By way of summary, the process of this invention involves the following steps:

1. Grinding or chopping: The organic waste material, such as, straw, hay or stover, ideally should be reduced in size to not over 2 inches in length to facilitate further handling. Grape pomice, cotton waste or other material with a initial small particle size need not be ground.

2. Chemical addition: The organic waste material is then conveyed to two continuous mixers (such as, a molasses mixer or similar equipment) by a belt, screw or pneumatic conveyor. The chemicals are introduced into the continuous mixer by suitable metering devices. Two mixers are preferable (although one mixer may be used sequentially) because about one half of the organic waste material is mixed with a combination of acids and the otherhalf is mixed with a combination of bases.

The chemicals (acid and bases) are calculated to supply the nutritionally necessary elements for a balanced diet, but such chemicals used in their chemically reactive form as an acid or base, instead of the conventionally-used salt form, such as, dicalcium phosphate or sodium chloride. As an example, this process introduces phosphoric acid, hydrochloric acid and/or sulfuric acid into the acid mixer and calcium hydroxide, sodium hydroxide, potassium hydroxide and/or ammonium hydroxide into the base mixer. These mineral acids and bases are used in amounts that eliminate the necessity of adding salt (sodium chloride), dicalcium phosphate (D.C.P.), sodium carbonate and/or potassium sulfate to the finished feed (in which this processed organic waste material of this invention is used as an ingredient).

3. The reactor: The previously mixed materials are held separately, for several hours, or days if desired, or immediately upon mixing and then are introduced in approximately equal amounts into a third mixer of similar construction as the previously mentioned mixers. A strong reaction (between the acid mixed organic material and the base mixed organic material) takes place in the third mixer. A certain amount of water is released as steam at this point if the moisture level has been properly adjusted to the range of 20 to 60 parts by weight (based on the total weight of the mixture), either by previous drying as might be the case with garbage or by the addition of the appropriate amount of water to the acid or base mixers (as would be the case with straw, corn or milo stover, corn cobs, gin trash, etc.). The reaction is exothermic.

4. Pelleting: Immediately from the reactor, the material may be conveyed to a pellet mill or cuber and compressed into pellets, or cubes, respectively. The pressure generated in the pressing operation further improves digestibility and facilities handling of the material. The previously mentioned acid-base treatment makes it possible to form a pellet or cube from straw, whereas this was not possible previously (i.e., without the acid-base treatment of this invention).

The following examples illustrate the invention, unless otherwise expressed herein, the terms percent, ratios and parts are on a weight basis.

EXAMPLE 1

Straw was chopped to a size not exceeding 2 inches in length. The following ingredients were admixed in a first conventional continuous cold molasses mixer with a polyethylene liner (acid resistant):

| Acid Side: | |
|---|---|
| Ingredients | Amount, kilograms |
| chopped straw | 900 |
| phosphoric acid (75%) | 50 |
| sulfuric acid (96%) | 40 |
| hydrochloric acid (32%) | 10 |
| water | 200 |
| Total: | 1200 kilograms |

The following ingredients were admixed in a second conventional cold molasses mixer with a polyethylene liner (acid resistant);

| Base Side: | |
|---|---|
| Ingredients | Amount, kilograms |
| chopped straw | 900 |
| sodium hydroxide (40%) | 100 |
| potassium hydroxide (40%) | 100 |
| calcium hydroxide (40%) | 100 |
| Total: | 1200 kilograms |

The acidified and basified organic waste material portions were mixed and reacted in a third conventional, continuous cold molasses mixer with a polyethylene liner (acid resistant) for 15 minutes. Taking into consideration the incorporation of molecular water used in the hydrolysis and the steam lost in the third mixer (reactor), the total processed material is as follows:

| Ingredients | Amount, kilograms | Percentages, (approx) |
|---|---|---|
| Total straw | 1800 } | 90.00 |
| molecular water | 200 } | |
| phosphoric acid | 50 | 2.35 |
| sulfuric acid (96%) | 40 | 1.80 |
| hydrochloric acid (32%) | 10 | 0.45 |
| sodium hydroxide (100%) | 40 | 1.80 |
| potassium hydroxide | 40 | 1.80 |
| calcium hydroxide | 40 | 1.80 |
| Total Product: | 2220 kilograms | 100.00 percent |

The resultant mixture was an easily digestible and easily-handled material.

The resultant material was then pelletized in a pelletizer, and was usable as an animal feed.

EXAMPLE 2

Example 1 was repeated except that the three base were replaced with 75 kilograms of sodium hydroxide (40%), 75 kilograms of potassium hydroxide (40%), 75 kilograms of ammonium hydroxide (40%) and 75 kilograms of calcium hydroxide (40%). The resultant final mixture was an easily digestible and easily-handled material. The resultant material was then pelletized in a pelletizer and was usable as an animal feed.

What is claimed is:

1. A process for the conversion of cellulose and lignin organic waste material into a more digestible and manageable form which consists of the steps:
   (a) reducing said cellulose or lignin organic waste material to a size less than 2 inches to facilitate further handling, when said organic waste material has a size greater than 2 inches, said cellulose or lignin organic waste material being selected from the group consisting of straw, stover, wood shavings, bagesse, corn cobs, peanut hulls, peat, tobacco stems, cocoa shells, rice hulls and soybean hulls;
   (b) admixing an acid selected from the group consisting of phosphoric acid, hydrochloric acid, sulfuric acid, and mixtures thereof with about 40 to 60 percent by weight of said organic waste material;
   (c) admixing, before, after or simultaneously with step (b), a base selected from the group consisting of calcium hydroxide, sodium hydroxide, potassium hydroxide, ammonium hydroxide and mixtures thereof with the remainder of said organic waste material; (d) mixing and reacting said acidified organic waste material with said basified organic waste material, a more digestible form of said organic waste material resulting, about 80 to 120 parts by weight of said acidified organic waste material being used per 100 parts by weight of said basified organic waste material, said reaction mixture contains about 20 to 60 percent by weight of water based on the total weight of said reaction mixture, said water level being achieved whenever said water level is not present by drying said starting cellulose or lignin organic waste material or adding water to said cellulose or lignin organic waste material or portion thereof used in step (b) or step (c), whereupon part of said water in said reaction mixture converted to steam by exothermic heat produced as said reaction progresses, and whereby said organic waste material is converted into a substantially dry, more digestible form; and
   (e) forming the reacted mixture of the step (d) into pellets, cubes, blocks or other similar forms.

2. A process as claimed in claim 1 wherein said size reduction is achieved by chopping or grinding.

3. A process as claimed in claim 1 wherein each portion of the waste material resulting from step (a) is conveyed to the subsequent admixing site by means of a belt, screw or pneumatic conveyor.

4. A process as claimed in claim 1 wherein said admixing steps (b) and (c) are each achieved in a continuous mixer.

5. A process as claimed in claim 4 wherein step (b) is achieved in a first continuous mixer and step (c) is achieved in a second continuous mixer.

6. A process as claimed in claim 4 where steps (b) and (c) are achieved sequentially in a single continuous mixer.

7. A process as claimed in claim 1 wherein said admixing steps (b) and (c) are achieved at a temperature between about 20° and about 150° F.

8. A process as claimed in claim 1 wherein all of said acids are used in step (b) and all of said bases are used in step (c).

9. A process as claimed in claim 1 wherein said acidified organic waste material of step (b) and said basified organic waste material of step (c) are immediately mixed together in step (d).

10. A process as claimed in claim 1 wherein said mixing step (d) is achieved in a continuous mixer.

11. A process as claimed in claim 1 wherein step (d) is achieved at a temperature between 20° and 150° F.

12. A process as claimed in claim 1 wherein step (e) involves pelletizing.

* * * * *